Figure 1:
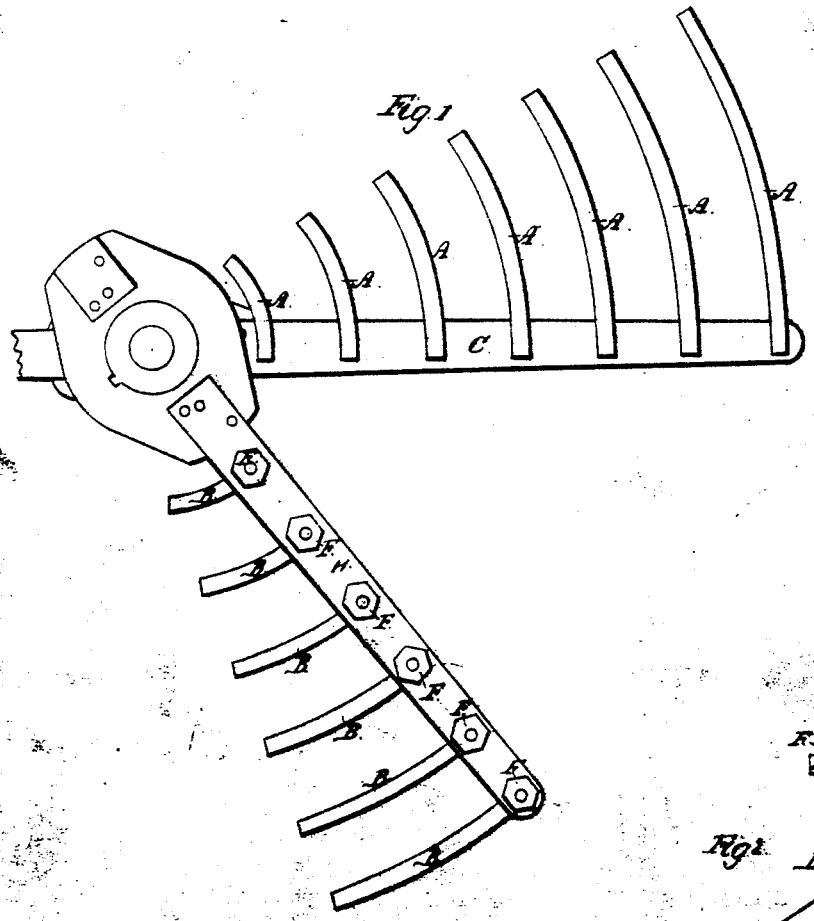
Figure 2:
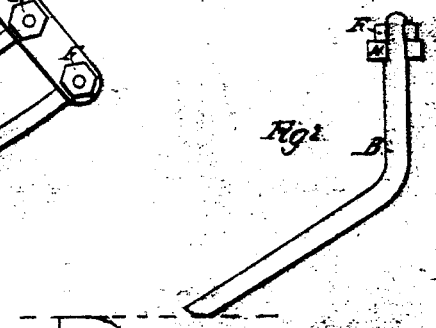
Figure 3:
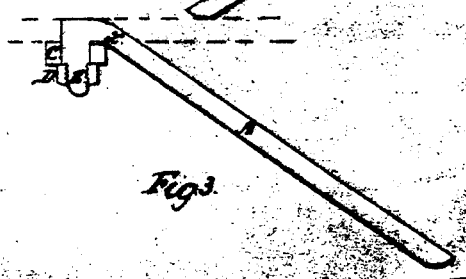

416-228

H I

A. Hammer.

Mashing App's for Liquors.

BEST AVAILABLE COPY

No 137. A. I. Patented Mar. 18, 1856.

Witnesses
Jno. Monison
Michael Rohrbach

Inventor
Adolph Hammer